United States Patent [19]
Spiegel

[11] Patent Number: 5,172,667
[45] Date of Patent: Dec. 22, 1992

[54] APPARATUS FOR CONTROLLING THE POWER DRIVE OF A VEHICLE

[75] Inventor: Guenter Spiegel, Worms, Fed. Rep. of Germany

[73] Assignee: Robert Bosch GmbH, Stuttgart, Fed. Rep. of Germany

[21] Appl. No.: 747,061

[22] Filed: Aug. 19, 1991

[30] Foreign Application Priority Data

Sep. 29, 1990 [DE] Fed. Rep. of Germany ....... 4030901

[51] Int. Cl.$^5$ .......................... F02D 7/00; F02D 3/00
[52] U.S. Cl. .................................... 123/399; 123/342; 123/396
[58] Field of Search ............... 123/396, 397, 342, 400, 123/403, 361, 198 D, 399, 340, 352; 180/197; 74/858

[56] References Cited

U.S. PATENT DOCUMENTS

| | | | |
|---|---|---|---|
| 4,453,576 | 6/1986 | Filsinger | 123/340 |
| 4,834,044 | 5/1989 | Maas | 123/342 |
| 4,848,297 | 7/1989 | Hickmann et al. | 123/342 |
| 4,953,529 | 9/1990 | Pfalzgraf et al. | 123/396 |
| 4,966,114 | 10/1990 | Basten | 123/396 |
| 5,014,806 | 5/1991 | Hamada | 180/197 |
| 5,020,496 | 6/1991 | Huber et al. | 123/399 |
| 5,065,722 | 11/1991 | Huber et al. | 123/399 |

FOREIGN PATENT DOCUMENTS

| | | | |
|---|---|---|---|
| 0341341 | 11/1989 | European Pat. Off. | 123/396 |
| 2186024 | 8/1987 | United Kingdom | 123/396 |

*Primary Examiner*—Raymond A. Nelli
*Attorney, Agent, or Firm*—Edwin E. Greigg; Ronald E. Greigg

[57] ABSTRACT

An apparatus for controlling the power drive of a vehicle, having a mechanical transmission device interposed between an actuator that determines a power drive output and a power drive operating element in which transmission device an adjusting element having a stop and being movable by a governor device to adjust the actuator is movable with respect to a coupler of the transmission device that has a counterpart stop from an unregulated position in which stops rest on one another to regulated positions in which stops are spaced apart from one another, counter to the action of one or more springs. In such an apparatus, an at least one intermittently operative coupling is provided to delay and/or stop the relative motion of the adjusting element relative to the coupler.

16 Claims, 2 Drawing Sheets

5,172,667

APPARATUS FOR CONTROLLING THE POWER DRIVE OF A VEHICLE

BACKGROUND OF THE INVENTION

The invention relates to an apparatus for controlling the power drive of a vehicle, having a mechanical transmission device interposed between the actuator determining the drive power output, such as a throttle valve, and the drive power operating element, such as the accelerator pedal; in this transmission device, an adjusting element that has a stop and is movable by a regulating device to adjust the actuator is movable, counter to the action of one or more springs and relative to a coupler of the transmission device that has a counterpart stop, from an unregulated position, in which stops rest on one another, to regulated positions, in which stops are spaced apart from one another.

Such an apparatus is known, for instance from German Offenlegungsschrift 36 08 751.

Regulating devices coupled to the mechanical transmission device are used in order to provide the actuator with a position deviating from its position predetermined by the operating element, for instance to avoid drive slip, or to provide progressive pedal characteristic curves, or to vary shifting processes in automatic transmissions. The adjusting element moved by the regulating device is held in a regulated position in this process, counter to the action of the springs, from which position it is moved by the springs suddenly into its unregulated position, if the regulating device fails, for instance if the electrical system fails; this can lead to reactions by the vehicle that are entirely unexpected and cannot be foreseen by the driver. If the regulating device fails during a mode in which the speed is being kept constant, the actuator returns astonishly suddenly into its idling position, which is equivalent to an abrupt let up on the gas. If the regulating device fails while the driver is calling for half acceleration with the operating element and the regulating device, because of a progressive pedal characteristic curve, keeps the actuator nearly at idling, then the vehicle accelerates astonishingly suddenly in a way that profoundly surprises the driver.

OBJECT AND SUMMARY OF THE INVENTION

The object of the invention, in an apparatus of the type defined above, is to assure safer operation even if the regulating device fails.

To attain this object, the invention proposes at least an intermittently operative coupling that delays and/or stops the relative motion of the adjusting element relative to the coupler. By means of this embodiment, the reaction of the apparatus to the failure of the regulating device is either delayed, or suppressed entirely. The coupling may be embodied such that the adjusting element can move from an extreme regulated position to a position that in terms of power is still unobjectionable, and in which it is the locked relative to the coupler. Furthermore the coupling may be embodied such that the adjusting element and thus the actuator is held firmly in each current position, so that if the electrical system fails, it remains in the same position and from there follows up the motion of the operating element. The relative position of the adjusting element with respect to the coupler is maintained, for instance until the adjusting element strikes an idling stop, whereupon it is then moved until it strikes the coupler, reinforced by a spring acting upon the coupler as a restoring spring, counter to the action of the coupling.

A further feature of the invention, in an apparatus having at least one coupling spring connecting the adjusting element and the coupler, provides that the coupling is disposed parallel to the coupling spring.

A further characteristic of the invention provides that the coupling is disposed directly between the coupler and the adjusting element.

A further feature of the invention provides that the coupling is embodied as a friction coupling that counteracts the relative motion between the coupler and the adjusting element and has a friction face and a friction element that cooperates with the friction face; the friction element is movable relative to the friction face by the relative motion of the adjusting element relative to the coupler between an initial position, which is associated with the unregulated position in which the stops rest on one another, and a terminal position, which is associated with the regulated position in which the stops are maximally spaced apart. This embodiment provides a particularly simple structure. The friction coupling may be simply a spring that runs over a comb.

A further characteristic of the invention provides that the friction face comes to an end before the terminal position as viewed in the direction from the initial position to the terminal position of the friction element. In this embodiment, the friction coupling is inoperative in the region of maximum shifting of the adjusting element relative to the coupler.

A further feature of the invention provides that the friction face does not begin until after the initial position, as viewed in the direction from the initial position to the end position of the friction element. In this embodiment, the use of the friction coupling is limited to the range of relatively long regulated travel.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
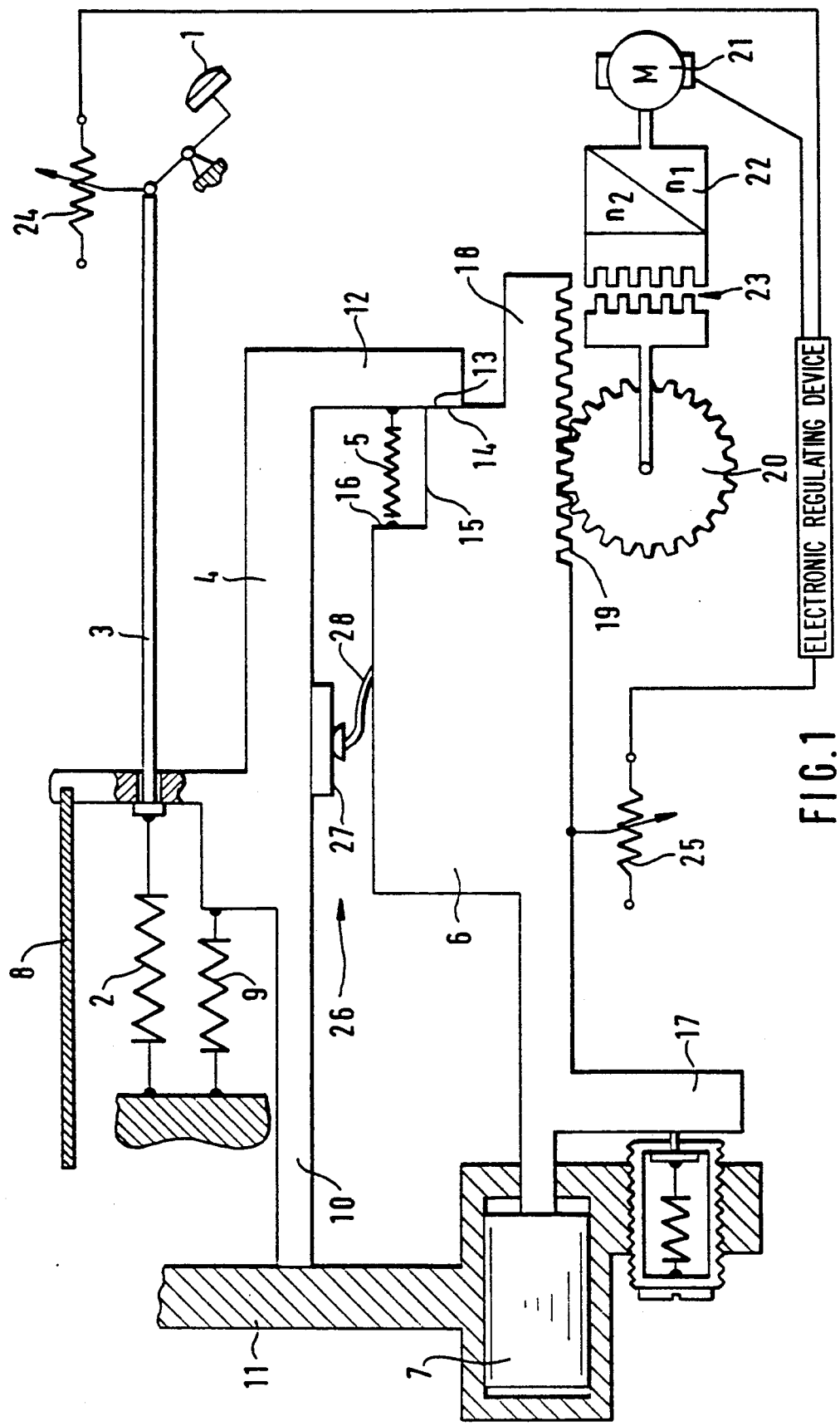
FIG. 1 is a linearized illustration of a first exemplary embodiment of the apparatus according to the invention.

In the exemplary embodiment shown in FIG. 1, the operating element 1, embodied as an accelerator pedal, of a vehicle drive motor, not shown, is connected via a Bowden cable 3, provided with a restoring spring 2, to a coupler 4 that is coupled by means of a coupling spring 5 to an adjusting element 6, which in turn is mechanically connected directly to the actuator element 7, which is shown only symbolically and may for instance be a throttle valve.

The coupler 4 is connected to a gear trigger means via a transmission element 8. Also engaging the coupler 4 is a restoring spring 9, which seeks to hold the coupler 4, by its extension 10, in contact with the housing wall 11. On the end opposite the extension 10, the coupler 4 has a right-angle bend 12 having a counterpart stop 13 for a stop 14 embodied on the adjusting element 6.

The adjusting element 6 is provided with a recess 15, adjoining the stop 14, for receiving the coupling spring 5, which in turn engages the end of the coupler 4 at one end and on the other engages the wall 16, defining the recess 15, of the adjusting element 6. The adjusting element also has a laterally protruding extension 17 for the engagement of an idling stop, which as shown may be embodied as a resilient emergency idling stop. On its end 18 remote from the actuator, the adjusting element 6 also, via a toothed profile section 19, engages a gear wheel 20 driven by a control drive of an electronic regulating device. This gear wheel 20 is driven by a control motor 21 via a gear 22 and an electrically actuatable coupling 23.

The position of the operating element 1 is carried to the electronic regulating device via a set-point value sensor 24, and the position of the actuator 7 is carried to the electronic regulating device via an actual-value sensor 25.

Between the coupler 4 and the adjusting element 6, a coupling 26 is disposed parallel to the coupling of the coupler 4 and adjusting element 6 that is created by the coupling spring 5 together with the stop 14 and the counterpart stop 13. This coupling 26 comprises a friction face 27, disposed on the coupler 4, and a friction element 28 permanently connected to the adjusting element 6 and pressed elastically against the friction face 27.

In normal operation, the position of the operating element 1 is detected by the set-point value sensor 24 and carried to the electronic regulating device, which calculates a set-point position of the actuator 7 in accordance with the particular, usually progressive, pedal characteristic curve and regulates the actuator 7 to this set-point value position via the electric control motor 21. In this process the adjusting element 6 is shifted by the control motor 21, counter to the action of a coupling spring 5, relative to the coupler 4 firmly held by the position, predetermined by the driver, of the operating element 1 so that a spacing appropriate for the particular regulated position is created between the stop 14 of the adjusting element 6 and the counterpart stop 13 of the coupler 4. In the coupling shown in FIG. 1, this relative motion generated by the control motor 21, between the adjusting element 6 and the coupler 4 which is kept stationary, leads to corresponding relative motion of the friction element 28 on the friction face 27, so that the control motor 21 must overcome not only the resultant frictional force but also the force of the coupling spring 5 in order to move the adjusting element 6 to its regulated position, or must equalize these force in order to keep the adjusting element 6 in the regulated position. If the current then fails, so that the drive connection of the control motor 21 with the gear wheel 20 via the coupling 23 also fails, then while the coupler 4 continues to be kept stationary without change, the braking force of the friction coupling 26 and the force of the coupling spring 5 no act upon the adjusting element 6 as external forces.

If the coupling 26 is designed such that its braking force, in each regulated position, is always greater than the force of the coupling spring 5, then the adjusting element 6 and thus the actuator 7 remain in their respective regulated positions, and the failure of the electrical system causes no reactions on the part of the vehicle whatever. If the position of the operating element is changed after that, then the relative position of the coupler 4 and adjusting element 6 remains unchanged until such time as the adjusting element 6 when the driver lets up on the gas, strikes the idling stop or the resilient emergency idling stop with its extension 17 and is then moved, by the restoring spring 9 acting on the coupler 4, along with the coupling spring 5 to its unregulated position in which the stops 13, 14 contact one another. After that, any change in the position of the operating element 1 is transmitted directly to the actuator 7 by the apparatus according to the invention, because the coupling of the coupler 4 and adjusting element 6, provided by the coupling spring 5 and the coupling 26, can no longer be undone.

The coupling may also be designed such that only those regions of the relative motion between the coupler 4 and the adjusting element 6 that would cause undesirable vehicle reactions are detected. For instance for the regulated segment beginning at zero relative motion and extending up to the maximum regulating stop, the lower region that applies to only short regulating travel can be omitted. The uppermost range of the control travel may also be omitted, in which case if the electrical system fails the vehicle drive motor will run up only to a state that is unobjectionable in terms of power, until the adjusting element 6 remains stuck in a given position.

In order to stop the adjusting element reactive to the coupler only in certain ranges of the aforementioned adjusting travel, the friction face 27 may for instance be provided only in the regions associated with the desired regions of the regulated travel, so that the friction element 28 moves freely outside these ranges. Alternatively, instead of leaving the other regions without any braking action, a reduced braking action may be provided in these other ranges, either by means of differently embodied friction faces 27 or by varying the contact force of the friction element 28. For instance, the friction face could be disposed obliquely to the direction of the relative motion between the coupler 4 and the adjusting element 6, so that the contact force of the friction element 28, embodied as a spring, increases with increasing proximity between the two stops 13, 14.

If desired, the coupling spring 5 and coupling 26 may also be adapted to one another in such a way that the relative motion between the coupler 4 and the adjusting element 6, although not completely suppressed, is slowed down severely, so that the driver ca react to the various reactions of the vehicle without panicking.

Figure 2:
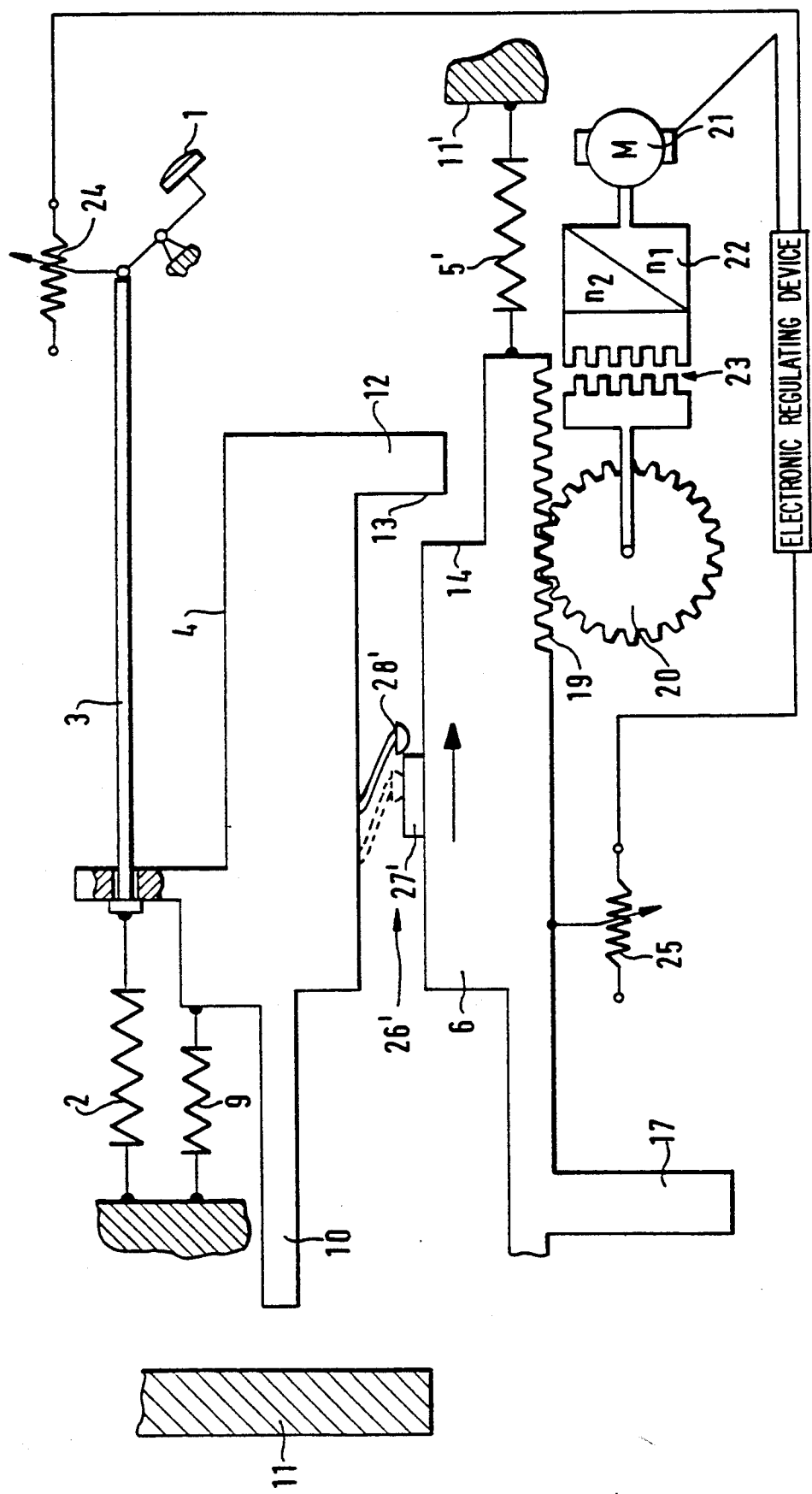
FIG. 2, similarly to FIG. 1, shows a second embodiment of the apparatus according to the invention.

FIG. 2 shows an embodiment of the present invention in which the spring force coupling between the coupler and the adjusting element 6 is effected not by a coupling spring 5 connecting the coupler 4 and adjusting element 6 to one another directly, as in the exemplary embodiment of FIG. 1, but rather by means of a tension spring 5' disposed between the adjusting element 6 and a housing wall 11'. In this embodiment of the invention, the coupling 26' is embodied such that beginning at the terminal position, shown, of the friction element 28' mounted on the coupler 4, it does not become operative until after a relative motion of a predetermined magnitude, until the friction element 28' has reached the friction face 27' provided on the adjusting element 6.

Instead of the couplings 26, 26' operating on both directions of motion as described, other friction couplings can naturally be used, the braking action of which is great in the direction of movement of the two stops 13, 14 toward one another and is slight or zero in the direction in which the two stops 13, 14 move apart from one another.

Although the invention has been described in conjunction with friction couplings, it is not way limited to such couplings.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for controlling a power drive engine of a vehicle, having a mechanically operated transmission device provided with a coupler (4) interposed between an actuator (7) that determines a power drive engine output and a power drive operating element (1), said mechanically operated transmission device including an adjusting element (6) having a first stop means (14), said adjusting element being movable by a regulating device for adjusting the actuator (7) in a direction counter to an action of at least one spring (5) with respect to said coupler, said coupler having a counterpart second stop means (13), said mechanically operated transmission device is movable from a first position in which said first and second stop means rest on one another to a second position in which said first and second stop means are spaced apart from one another, said apparatus includes a coupling (26, 26') that is at least intermittently operative selectively to delay and to stop a motion of the adjusting element (6) relative to the coupler (4).

2. An apparatus as defined by claim 1, having at least one coupling spring connecting the adjusting element and the coupler, in which the coupling (26) is disposed parallel to the coupling spring (5).

3. An apparatus as defined by claim 1, in which the coupling (26, 26') is disposed directly between the coupler (4) and the adjusting element (6).

4. An apparatus as defined by claim 2, in which the coupling (26, 26') is disposed directly between the coupler,(4) and the adjusting element (6).

5. An apparatus as defined by claim 1, in which the coupling (26, 26') is embodied as a friction coupling which counteracts the relative motion between the coupler (4) and the adjusting element (6), said friction coupling has a friction face (27, 27') and a friction element (28, 28') that cooperate with the friction face, the friction element being movable compared with the friction face (27, 27') by the relative motion of the adjusting element (6) relative to the coupler (4) between the first position, in which the first and second stop means (13, 14) rest on one another, and the second position in which the first and second stop means (13, 14) are maximally spaced apart.

6. An apparatus as defined by claim 2, in which the coupling (26, 26') is embodied as a friction coupling which counteracts the relative motion between the coupler (4) and the adjusting element (6), said friction coupling has a friction face (27, 27') and a friction element (28, 28') that cooperate with the friction face, the friction element being movable compared with the friction face (27, 27') by the relative motion of the adjusting element (6) relative to the coupler (4) between the first position, in which the first and second stop means (13, 14) rest on one another, and the second position in which the first and second stop means (13, 14) are maximally spaced apart.

7. An apparatus as defined by claim 3, in which the coupling (26, 26') is embodied as a friction coupling which counteracts the relative motion between the coupler (4) and the adjusting element (6), said friction coupling has a friction face (27, 27') and a friction element (28, 28') that cooperate with the friction face, the friction element being movable compared with the friction face (27, 27') by the relative motion of the adjusting element (6) relative to the coupler (4) between the first position, in which the first and second stop means (13, 14) rest on one another, and the second position in which the first and second stop means (13, 14) are maximally spaced apart.

8. An apparatus as defined by claim 4, in which the coupling (26, 26') is embodied as a friction coupling which counteracts the relative motion between the coupler (4) and the adjusting element (6), said friction coupling has a friction face (27, 27') and a friction element (28, 28') that cooperate with the friction face, the friction element being movable compared with the friction face (27, 27') by the relative motion of the adjusting element (6) relative to the coupler (4) between the first position, in which the first and second stop means (13, 14) rest on one another, and the second position in which the first and second stop means (13, 14) are maximally spaced apart.

9. An apparatus as defined by claim 5, in which the friction face (27') ends before the second position, as viewed in a direction from the first position to the second position of the friction element (28').

10. An apparatus as defined by claim 6, in which the friction face (27') ends before the second position, as viewed in a direction from the first position to the second position of the friction element (28').

11. An apparatus as defined by claim 7, in which the friction face (27') ends before the second position, as viewed in a direction from the first position to the second position of the friction element (28').

12. An apparatus as defined by claim 8, in which the friction face (27') ends before the second position, as viewed in a direction from the first position to the second position of the friction element (28').

13. An apparatus as defined by claim 5, in which the friction face does not begin until after the first position, as viewed in a direction from the first position to the second position of the friction element.

14. An apparatus as defined by claim 6, in which the friction face does not begin until after the first position, as viewed in a direction from the first position to the second position of the friction element.

15. An apparatus as defined by claim 7, in which the friction face does not begin until after the first position, as viewed in a direction from the first position to the second position of the friction element.

16. An apparatus as defined by claim 8, in which the friction face does not begin until after the first position, as viewed in a direction from the first position to the second position of the friction element.

* * * * *